United States Patent [19]

Wang et al.

[11] Patent Number: 4,869,894
[45] Date of Patent: Sep. 26, 1989

[54] HYDROGEN GENERATION AND RECOVERY

[75] Inventors: Shoou-I Wang, Allentown; William R. Koch, Fleetwood, both of Pa.

[73] Assignee: Air Products and Chemicals, Inc., Allentown, Pa.

[21] Appl. No.: 38,819

[22] Filed: Apr. 15, 1987

[51] Int. Cl.[4] .............................................. C01B 1/13
[52] U.S. Cl. ...................... 423/650; 55/26; 55/58; 423/652
[58] Field of Search ............. 55/26, 58; 423/650, 423/652

[56] References Cited

U.S. PATENT DOCUMENTS

| | | | |
|---|---|---|---|
| 3,150,942 | 10/1959 | Vasan | 55/31 |
| 3,176,444 | 9/1962 | Kiyonga | 55/26 |
| 3,430,418 | 8/1987 | Wagner | 55/25 |
| 3,563,695 | 3/1969 | Benson | 23/2 |
| 3,788,037 | 6/1971 | Shell et al. | 55/58 |
| 4,000,990 | 10/1976 | Sircar | 55/25 |
| 4,077,779 | 4/1975 | Bingham | 55/30 |
| 4,553,981 | 11/1985 | Fuderer | 422/234 |
| 4,592,860 | 6/1986 | Fuderer | 252/376 |
| 4,599,094 | 7/1986 | Werner et al. | 55/58 |
| 4,778,670 | 10/1988 | Pinto | 55/25 |

Primary Examiner—John Doll
Assistant Examiner—Wayne A. Langel
Attorney, Agent, or Firm—James C. Simmons; Keith D. Gourley; William F. Marsh

[57] ABSTRACT

High yields of hydrogen of high purity are obtained from a methane-rich gas stream, such as natural gas, by a particular combination of operations wherein the methane-rich gas undergoes primary steam reforming under less severe operating conditions including lower steam to carbon ratio, supplemented by secondary reforming with oxygen, the obtained hydrogen is separated from accompanying carbon dioxide in the reformer effluent by a special five step pressure swing adsorption sequence having the steps of selective $CO_2$ adsorption at superatmospheric pressure, rinsing with desorbed carbon dioxide, depressuring and then evacuating without additional rinsing, followed by repressuring the bed with part of the recovered pure hydrogen.

9 Claims, 2 Drawing Sheets

HYDROGEN GENERATION AND RECOVERY

TECHNICAL FIELD

The present invention is concerned with the production of hydrogen by reforming of a methane-rich gas stream and subsequent treatment of the reformer effluent for desired recovery of hydrogen separated from accompanying carbon dioxide and other contaminants.

BACKGROUND OF THE INVENTION

Current methods to produce hydrogen by steam methane reforming (SMR) usually require energy intensive processes. In conventional operations where a chemical solvent is employed to remove carbon dioxide from the reformed gases, the steam to carbon ratio (S/C) for the SMR reaction is set at a high ratio, in the order of 6/1 or somewhat higher, thus requiring a relatively high energy to generate the required steam. Also, the known chemical solvent processes typically require a comparatively high energy input for regeneration of the CO$_2$-laden solvent. On the other hand, if a conventional pressure swing adsorption (PSA) system is employed to remove CO$_2$ from the reformed gas, hydrogen recovery is low, and the CO$_2$ recovery and purity are also low thus requiring a larger quantity of natural gas feed to the SMR operation and employing larger equipment in the reforming areas for a given hydrogen production capacity.

A typical prior art system employing chemical solvent for removal of CO$_2$ from the hydrogen-rich gas produced by steam-methane reforming (SMR) generally comprises a primary reformer, with provision for waste heat recovery, followed by reactors for high and low temperature water gas shift reaction to convert contained CO to CO$_2$, according to the equation:

$$CO + H_2O \rightarrow CO_2 + H_2 \tag{I}$$

Usually a methanation reactor is also employed for removal of residual carbon oxides by hydrogenation, according to the equations:

$$CO + 3H_2 \rightarrow CH_4 + H_2O \tag{II}$$

$$CO_2 + 4H_2 \rightarrow CH_4 + 2H_2O \tag{III}$$

In such conventional SMR operations employing chemical solvent for H$_2$/CO$_2$ separation the steam to carbon ratio (S/C) in the feed to the reformer is set high (typically about 6.5) to provide a low methane concentration in the reformer effluent and to provide sufficient heat to drive the reboiler operation employed. The concentration of methane in the reformer effluent is about 2.75 mol% on a dry basis. The reformer effluent is cooled (as to about 685° F.) before introduction into the high temperature shift convertor and the product from the high temperature shift reaction further cooled (as to about 425° F.) for introduction into the low temperature shift convertor. The effluent from the low temperature shift reaction is sent to a chemical solvent absorber system for removal of CO$_2$.

Typical solvent systems for CO$_2$ removal by absorption from a hydrogen stream employ potassium carbonate solution or monoethanolamine (MEA) or mixtures of these; see, for example, U.S. Pat. No. 3,563,695. The solvent is regenerated by heating the drive off absorbed CO$_2$, which is vented. The effluent hydrogen stream leaving the absorbent system may contain up to about 0.1% CO$_2$ which is converted to methane by methanation. The methanation effluent will typically comprise on a dry basis about 96% hydrogen containing small amounts of methane and nitrogen as impurities.

A typical PSA system for removal of CO$_2$ from a hydrogen-rich gas stream produced by SMR generally comprises primary reformer (SMR) and shift convertors as in the system previously described. Since a higher methane leakage can be tolerated in systems employing PSA for CO$_2$/H$_2$ separation, the methane concentration in the stream leaving the primary reformer may be in the order of 8.25 mole% (dry basis). Following high and low temperature shift conversion the stream is cooled (to about 100° F.) before introduction into the PSA unit. In the conventional PSA unit for CO$_2$ removal from a hydrogen-rich stream a typical reject stream may comprise 19.8% methane, 47.8% CO$_2$, 0.1% N$_2$, 1.8% CO and 29.4% H$_2$, and is generally employed as fuel in the steam reformer furnace. Hydrogen of 99.99+% purity is obtained as primary effluent from the PSA unit constituting about 85% of the hydrogen content of the stream entering the PSA adsorber.

Prior art PSA systems for bulk separation of hydrogen by selective adsorption of contained oxides of carbon and/or hydrocarbon gases from mixtures containing these are described in U.S. Pat. No. 4,077,779 and other patents therein cited. The '779 patent describes adsorptive separation of CO$_2$ from a gas mixture also containing hydrogen or methane in a unit comprising five or more columns containing selective adsorbent, operated in parallel in a repeated cycle, employing in sequence in each column the steps of (1) adsorption, (2) rinsing with secondary component, (3) depressurization of the rinsed column, (4) purging the column with air or inert gas followed by (5) evacuation to desorb the column and finally (6) repressuring the column for repetition of the cycle. The described operation utilizes two rinse or purge steps, one at high pressure using secondary product gas recovered from the gas mixture being separated, and another at low pressure using air or inert gas from an outside source.

Other patents relevant to recovery of purified hydrogen from a steam methane reformate by PSA are listed below.

U.S. Pat. No. 3,150,942 describes purification of a crude hydrogen gas stream produced by methane steam reforming, wherein the impure reformer effluent is passed through two adsorbent beds in series. In the first bed type 13X molecular sieve is employed to remove all the water vapor and most of the CO$_2$. In the second bed 4A or 5A type molecular sieve is employed to adsorb remaining impurities (chiefly CO) so as to yield a hydrogen product having a maximum of 0.2% impurities and being free of water vapor and oxides of carbon. Regeneration of both adsorbents is carried out by passing previously purified hydrogen as purge gas through both adsorbent beds in reverse flow and further desorption of the purged beds by heating. In certain preferred operations described in the patent, the initial steam reformate is cooled and treated with water vapor in a catalytic converter for oxidation of the CO content, yielding additional hydrogen and CO$_2$.

Among various other gas purification processes disclosed in U.S. Pat. No. 3,176,444 using PSA is an example (FIG. 6 of the patent, and column 28) for removal of CO$_2$ from a crude hydrogen stream using activated carbon adsorbent. The pressurized crude feed is passed through a dehydrator and then through a bed of activated carbon wherein carbon oxides are adsorbed. Part of the effluent is employed in partial repressuring of a companion adsorbent bed. On termination of the adsorption stroke the adsorbent bed is subjected to co-current depressuring to remove void gas, until a preset intermediate pressure level. Further desorption is then had in countercurrent direction until the bed is just above atmospheric pressure level. Following the desorption steps the bed is repressured with collected hydrogen product.

In U.S. Pat. No. 3,430,418 the removal of impurities from a hydrogen-rich gas stream is described, wherein each of the adsorbent columns contains a first layer of activated carbon adsorbent and a second layer of zeolitic molecular sieve (calcium zeolite A). The activated carbon section selectively removes water and $CO_2$ from the feed gas and the zeolite selectively removes CO and $CH_4$. In a six step cycle including co-current and countercurrent depressuring followed by purging of the bed at atmospheric pressure, 76.5% of the feed hydrogen was recovered in the product.

U.S. Pat. No. 3,788,037 discloses a PSA operation applicable to recovery of hydrogen from a mixture such as that of a steam methane reforming operation, employing a low pressure purge step in the designed PSA cycle. In the specific example disclosed in the patent, hydrogen recovery was approximately 70% by volume of the hydrogen content of the feed.

While the adsorption system described in U.S. Pat. No. 4,000,990 is particularly directed to recovery of methane from landfill gas, the patent indicates that the process therein described can be utilized for upgrading a hydrogen-rich stream containing oxides of carbon and a small amount of methane. In the described process of the patent the feed gas is subjected to pretreatment in a thermally regenerated adsorbent bed followed by a pressure swing adsorbent unit. The PSA unit is operated in a designed sequence consisting of (a) adsorption at superatmospheric pressure while collecting unadsorbed effluent, followed by regeneration of the impurity-laden bed by (b) countercurrent venting to about atmospheric pressure level, (c) evacuation of the vented bed to subatmospheric level to effect desorption, and repressuring the bed to superatmospheric level with part of the primary effluent being charged countercurrently into the bed.

In certain known prior art processes, such as U.S. Pat. No. 3,479,298, methane-containing gas is subjected to a two-stage reforming operation, wherein following a primary reforming by reaction with steam, the obtained hydrogen-rich reaction product is subjected to secondary reforming by reacting the previously unreacted methane therein with oxygen. Thus, the methane (and other possibly contained hydrocarbons) undergo principal reactions as indicated by the equations below:

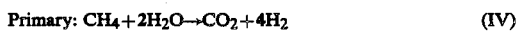

Primary: $CH_4 + 2H_2O \rightarrow CO_2 + 4H_2$ \hfill (IV)

Secondary: $CH_4 + O_2 \rightarrow CO_2 + 2H_2$ \hfill (V)

Among the objects of the present invention are to provide a process for efficient generation and recovery of hydrogen by reforming of a methane-rich gas stream under conditions of low capital and operating costs, and whereby the capacity of an existing SMR system can be beneficially extended.

SUMMARY OF THE INVENTION

In accordance with the present invention, a methane-rich gas stream is subjected to steam reforming in a primary reformer at a low steam to carbon ratio and the resulting reaction product is subjected to secondary reforming by reaction of contained methane with oxygen. $CO_2$ is removed from the obtained hydrogen-rich product, by a vacuum swing adsorption (VSA) process avoiding problems and drawbacks of the prior art methods and obtaining high hydrogen recovery at high product purity. The vacuum swing adsorption unit utilized in accordance with the invention preferably employs a five-step cycle in which (A) the feed gas mixture is passed into one of a plurality of parallel adsorption beds wherein the $CO_2$ is selectively adsorbed and hydrogen passes through the bed as substantially pure primary product;

(B) at the termination of the adsorption step in the preset cycle the $CO_2$-containing bed is rinsed at superatmospheric pressure with a stream of $CO_2$ previously recovered during desorption of a companion bed, to remove any remaining hydrogen and methane present in the voids of the bed or co-adsorbed on the adsorbent, the rinse effluent being recycled to the feed gas;

(C) following the rinse operation the rinsed bed is depressured to an intermediate pressure level by gas withdrawal countercurrent to that of step (A), thereby at least partially removing the adsorbed component ($CO_2$) from the bed;

(D) immediately following said depressuring to the desired level and without intermediate purging or rinsing, the bed is evacuated to a subatmospheric pressure level thereby further removing adsorbed components;

(E) following step (D) the evacuated bed is brought back to designed superatmospheric pressure level to prepare the bed for repetition of the recited cycle.

Thus, the present invention is based on a synergistically inter-related combination of features wherein:

(i) natural gas or other methane-rich gas mixture is subjected to primary reforming by reaction with steam followed by secondary reforming by reaction of residual methane with gaseous oxygen;

(ii) the primary reforming is carried out under less severe operating conditions, including lower temperature and lower S/C ratio than conventional, made possible because of the subsequent secondary reforming step, (the secondary reforming of oxygen converts the methane in the effluent stream to a very low level of methane (less than 0.5 mole%) on a dry basis);

(iii) separation of $CO_2$ and other impurities from the primary/secondary reformer effluent is carried out in a special vacuum swing adsorption sequence which does not consume steam, thereby further avoiding excess steam demand in the primary reforming;

(iv) efficient use of the special five step sequence of the vacuum swing adsorption unit is made possible as a result of the coupled second stage reforming employed which removes any methane. Since after the shift reaction the only major components are $CO_2$ and hydrogen, very little $CH_4$ is present in the resulting gas stream, thus enabling recovery of the hydrogen product at high purity and at high yield; and (v) the special vacuum swing adsorption sequence employed to remove $CO_2$ from the hydrogen-rich reformer effluent removes only $CO_2$, enabling high recovery of the hydrogen content. The recovered hydrogen product contains low impurity levels of $CH_4$ and $N_2$, which impurities do not detract from most industrial processes wherein high purity hydrogen is required.

In addition to the foregoing features, the use of a secondary reformer permits operation of the primary reformer at a lower outlet temperature, which enables use of a smaller primary reformer and enables a lower natural gas feed for a given hydrogen capacity.

Use of the special PSA cycle is of unique advantage because the methane concentration leaving the secondary reformer is low, permitting use of a system that is not required to remove $CH_4$ as well as $CO_2$. A final hydrogen product has an acceptably low methane concentration, even following optional methanation of the hydrogen product effluent from the PSA unit. Also, since only $CO_2$ needs to be removed in the PSA unit no steam is required and addition of excess steam to the process feed gas charged to the primary reformer is not required. While in the conventional PSA process for $H_2/CO_2$ separation only up to about 85% of the hydrogen is recovered, the special PSA sequence used in practice of the present invention enables very high recovery of hydrogen (99%) because the unit is designed to selectively adsorb only $CO_2$ from the reformate.

The operation of the invention will be understood and certain of the advantages thereby obtained will be further appreciated from the detailed description which follows read in connection with the accompanying drawings, illustrating a practical embodiment of a system by which the invention may be practiced.

IN THE DRAWINGS

DETAILED DESCRIPTION

Figure 1:
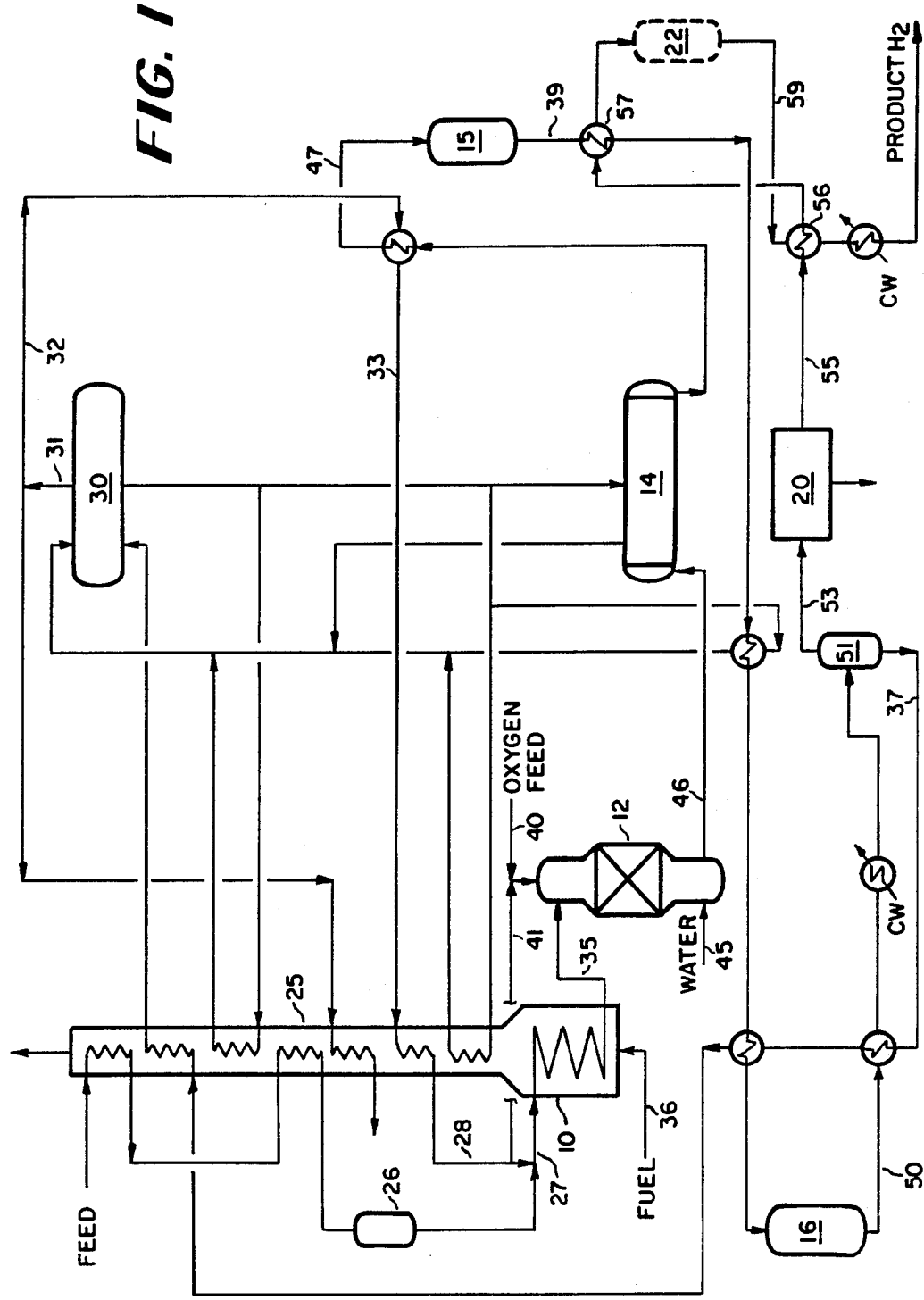
FIG. 1 is a process flow diagram of a system for primary and secondary reforming of a methane-rich gas stream according to the invention.

A practical system that may be utilized in the practice of the invention, as illustrated in FIG. 1, comprises principally a conventional primary reformer furnace 10, a secondary reformer 12, a process waste heat boiler 14, a high temperature shift convertor 15, and a low temperature shift convertor 16. The hydrogen-rich stream from the two stages of water gas shift reaction is subjected to separation of $CO_2$ therefrom by selective adsorption in a multi-column VSA unit indicated at 20 and further illustrated in detail in FIG. 2. If desired, any residual $CO_2$ remaining in the hydrogen product discharged from unit 20, may be converted by conventional methanation as indicated at 22.

Before being subjected to primary reforming in furnace 10, the $CH_4$-rich gas feed, for example natural gas, is preheated by several stages of heat exchange in furnace stack 25 and is desulfurized as indicated at 26.

To the desulfurized gas stream leaving desulfurizer 26 via line 27 steam is added, as indicated at 28, coming from drum 30 via lines 31, 32 and 33. In a typical operation for steam reforming of a natural gas stream or other methane-rich gas stream for production of hydrogen in accordance with the invention, a low steam to methane molar ratio is required in the primary reformer, in the order of about a steam to carbon ratio of up to approximately 3 more preferably up to approximately 2.5. Thus, more export steam is available as compared to conventional primary reforming operation where the S/C ratio is about 6.5. Also, because an oxygen secondary reformer is to be employed following the primary reforming operation, the outlet temperature from the primary reformer can be decreased and economic use of a primary reformer of lower capacity is made possible.

The mixture of feed gas and steam may be charged to primary reformer furnace 10 at a pressure in the range of 350 to 375 psia and at a temperature in the range of about 800° to 850° F. Under these conditions the reformed product leaving furnace 10 via line 35 will contain in addition to unconverted methane and steam, a major quantity of product hydrogen with minor amounts of gaseous oxides of carbon (CO and $CO_2$). In the illustrated embodiment fuel for furnace 10 may comprise natural gas supplied by line 36.

In secondary reformer 12 the primary reformer effluent introduced by line 35 is reacted with oxygen supplied through line 40 and part of the steam from line 28 introduced by line 41. In reactor 12 the principal reaction is the conversion of methane in the feed to $H_2$ and $CO_2$.

The reaction products leaving reactor 12 by line 46 will be at a temperature generally in the range of 1650° to 1800° F. which is the approximate temperature of the reaction in reactor 12 itself. The reaction products in line 46 have a residual methane content of less than approximately 0.5 mole percent, preferably in the range of approximately 0.1 to 0.4 mole percent, optimally approximately 0.2 mole percent. Part of the heat content is given up in waste heat boiler 14 and other heat exchange provisions, before introduction by line 47 into high temperature shift reactor 15. The high temperature shift is carried out at a temperature in the range of 675°–820° C. Any of the known high temperature shift catalysts may be employed, preferably chrome-promoted iron oxide. In reactor 15 most of the CO in the charge is converted to $CO_2$ by the reaction shown in Equation I above, with accompanying production of hydrogen. The reaction product discharged from reactor 15 undergoes several stages of heat exchange and is introduced into the low temperature shift reactor 16 at a temperature in the range of 400° to 470° C. Any of the known low temperature shift catalysts may be employed in reactor 16, preferably CuZn supported on $Al_2O_3$. The reactor product from 16 discharged by line 50 will comprise (on a dry basis) in the order of up to 75 or more percent hydrogen and 20 or more percent $CO_2$.

After several stages of heat exchange the product in line 50 is introduced into vapor-liquid separator 51 from which the liquid bottoms (principally water) are removed in line 37; while the vapor overhead is discharged through line 53 and subjected to selective adsorption in a VSA system (as indicated by box 20) for recovery of hydrogen freed of $CO_2$. The liquid bottoms in line 37 is recycled to drum 30, except optionally a portion may be removed to supply line 45 to quench the secondary reformer effluent.

While a number of prior art systems are known or have been used for removal of carbon oxide gases from a hydrogen-rich stream, to obtain the full advantages of the present invention the system hereinafter described and illustrated in FIG. 2 of the accompanying drawings is particularly suited for high yields of hydrogen at high product purity, while avoiding the costs and inconvenience of the large quantities of steam required by certain of the prior art hydrogen recovery systems.

Figure 2:
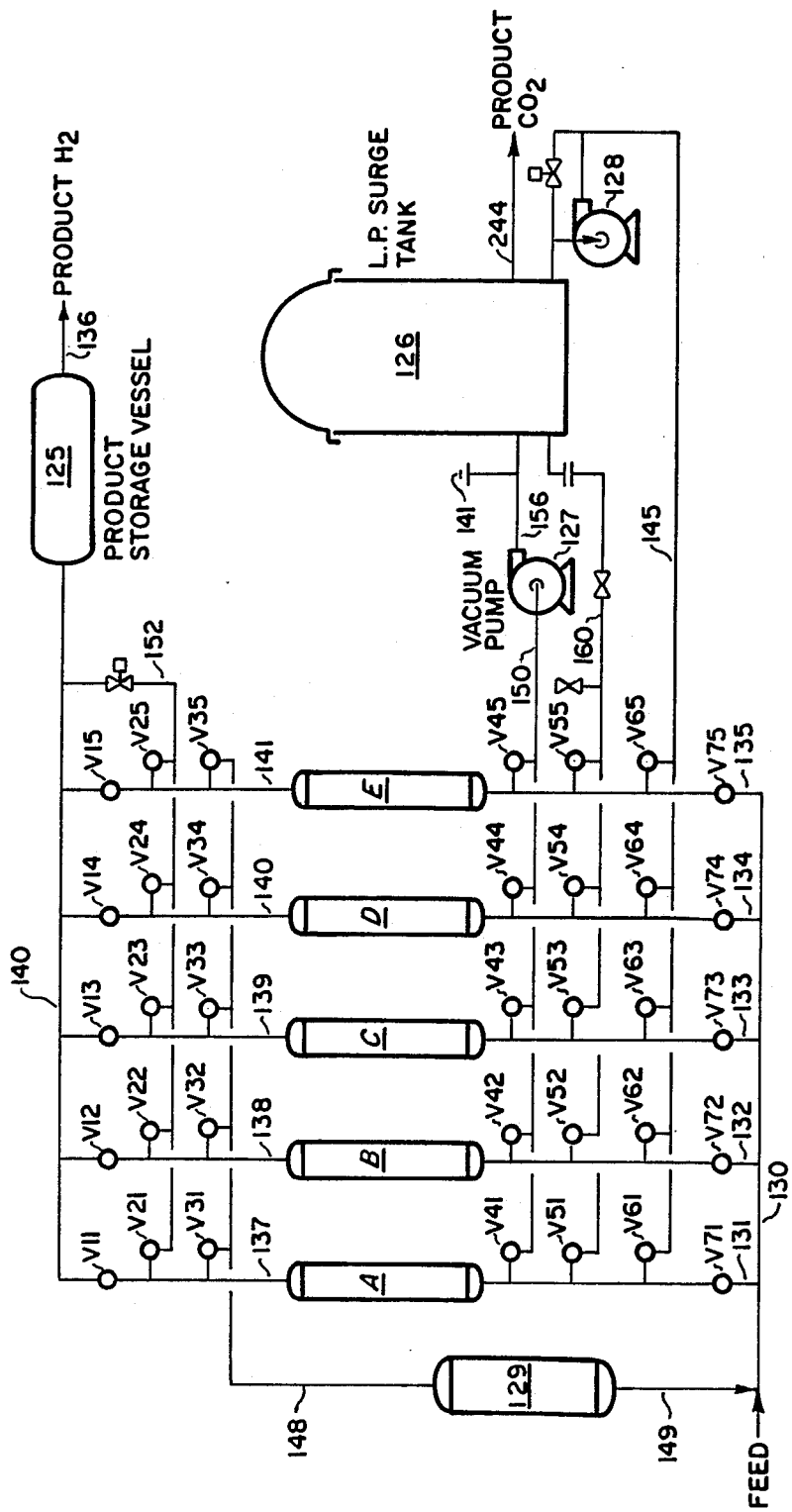
FIG. 2 is a process flow diagram of a preferred embodiment of a five column unit for removal of $CO_2$ from the hydrogen-rich product stream obtained by a two-stage reforming system of the type shown in FIG. 1.

While the $H_2/CO_2$ separation by the five step procedure in accordance with the invention can be carried out in a multi-column unit comprised of 4, 5 or 6 columns operated alternately in parallel, it is preferred to employ a five column unit as illustrated in FIG. 2. As seen in FIG. 2 of the drawings, the unit designated 20 in FIG. 1, is comprised of five columns: A, B, C, D and E, each containing a bed of $CO_2$-retaining adsorbent. The unit further comprises gas storage vessels 125 and 129, a low pressure surge tank 126, vacuum pump 127 and compressor 128 with appropriate valves and piping to carry out the operations hereinafter described.

The overhead gas product discharged from the separator 51 through line 53 (FIG. 1) is passed into manifold 130 connected to each of columns A, B, C, D and E, respectively, by lines 131, 132, 133, 134 and 135. Each of the columns A through E in turn goes through the five step cycle of operations described. Assuming that column A is then on-stream for the adsorption step, the feed is charged into that column from manifold 130 and line 131 through open valve V71, at the designed superatmospheric pressure, passing through the adsorbent bed which selectively sorbs $CO_2$ while unadsorbed hydrogen is discharged into manifold 140 through line 137 and open valve V11. The discharged primary effluent ($H_2$) is collected in storage vessel 125. The feed to be separated is charged to the on-stream adsorption column at a pressure preferably in the range of 50 to 500 psia, preferably about 300 psia, and at a temperature in the range of 50° to 120° F.

Among the preferred adsorbents employed in columns A to E are activated carbons or aluminosilicate molecular sieves such as 13X or 5A or other cation-exchanged zeolites selectively retaining $CO_2$.

A portion of the hydrogen collected in storage vessel 125 is used for repressuring of the various adsorbent beds during the course of the cyclic operation, as will hereinafter appear. Hydrogen for desired use or aftertreatment may be withdrawn from vessel 125 via line 136. When the bed in column A approaches breakthrough, that is when $CO_2$ has been adsorbed through most of the bed length and is about to emanate out of the bed into line 137, the adsorption in column A is terminated and the feed charge is switched to a companion column by opening the associated inlet valve.

At the termination of the adsorption step in the column, it is subjected to a cocurrent high pressure rinse (step b) with previously collected $CO_2$. As illustrated, $CO_2$ from surge tank 126 is withdrawn via compressor 128 into line 145 and supplied under pressure to column A through then open valve V61 and line 131. The $CO_2$ from surge tank 126 is compressed to a pressure approximately the same as that at which the feed gas was earlier charged through line 131. The $CO_2$ rinse gas passes through the adsorbent bed in column A replacing unadsorbed voids gas in the column and displacing coadsorbed $H_2$ and methane. The rinse is continued for a designed time period during which the carbon dioxide wave front approaches the effluent or downstream end of the bed in column A, at which point the rinse step is terminated.

During the rinse operation the rinse effluent from column A is discharged into line 137 passing through then open valve V31 into line 148 and surge tank 129, from which it is withdrawn by line 149 and added to the feed gas being charged by manifold 130 to one of the companion columns then on the adsorption step.

Upon termination of the rinse step in column A, desorption of that column is initiated. During this step in the cycle the pressure in the rinsed column is lowered from the superatmospheric level prevailing during adsorption and rinse, to an intermediate pressure at or close to about ambient atmospheric pressure. Such depressurization is effected countercurrently by controlled discharge of the desorbed gas ($CO_2$) from the column through open valve V51 and line 160 which connects into surge tank 126.

When the desired intermediate pressure level (ambient) is met, column A is switched to the fourth step of the operating cycle; evacuation. The evacuation of the column is carried out in the same direction as the preceding depressuring step and without subjecting the column to an intermediate purge or rinse. Evacuation of bed A is effected by vacuum pump 127, the evacuated gas flowing through open valve V41 and line 150 into the intake of the vacuum pump and discharging via line 156 in surge tank 126. If desired, a portion of the evacuated $CO_2$ in line 156 may be vented as indicated at 141.

By the evacuation the pressure of the column is reduced to subatmospheric level in the preferred range of about 50-150 torr. If so desired only evacuated $CO_2$ need be collected in surge tank 126, a portion of which is used in the described rinse step (b). All or part of the $CO_2$ withdrawn during the pressure let down (step c) may be vented to the atmosphere.

After evacuation for the designed time period, bed A is repressured to the superatmospheric pressure level (50–500 psia) for repetition of the cycle beginning with the adsorption step. Repressuring of column A is done countercurrently by admitting a portion of the collected hydrogen product from tank 125 through line 152 and open valve V21.

Each of the other beds B, C, D and E goes through a similar cycle. In the five column embodiment illustrated, the valve positions during operation of the unit are as shown in Table 2, based on a fifteen minute cycle in which each column goes through the sequence shown in Table 1 below:

TABLE 1

| Time (min.) | A | B | C | D | E |
|---|---|---|---|---|---|
| 0–3 | Ads | H.P.Rinse | Depress. | Evac. | Repress. |
| 3–6 | H.P.Rinse | Depress. | Evac. | Repress. | Ads |
| 6–9 | Depress. | Evac. | Repress. | Ads | H.P.Rinse |
| 9–12 | Evac. | Repress. | Ads | H.P.Rinse | Depress. |
| 12–15 | Repress. | Ads | H.P.Rinse | Depress. | Evac. |

TABLE 2

| Valve | Time (min.) | | | | |
|-------|-----|-----|-----|------|-------|
|       | 0-3 | 3-6 | 6-9 | 9-12 | 12-15 |
| V - 11 | o | x | x | x | x |
| 12 | x | x | x | x | o |
| 13 | x | x | x | o | x |
| 14 | x | x | o | x | x |
| 15 | x | o | x | x | x |
| V - 21 | x | x | x | x | o |
| 22 | x | x | x | o | x |
| 23 | x | x | o | x | x |
| 24 | x | o | x | x | x |
| 25 | o | x | x | x | x |
| V - 31 | x | o | x | x | x |
| 32 | o | x | x | x | x |
| 33 | x | x | x | x | o |
| 34 | x | x | x | o | x |
| 35 | x | x | o | x | x |
| V - 41 | x | x | x | o | x |
| 42 | x | x | o | x | x |
| 43 | x | o | x | x | x |
| 44 | o | x | x | x | x |
| 45 | x | x | x | x | o |
| V - 51 | x | x | o | x | x |
| 52 | x | o | x | x | x |
| 53 | o | x | x | x | x |
| 54 | x | x | x | x | o |
| 55 | x | x | x | o | x |
| V - 61 | x | o | x | x | x |
| 62 | o | x | x | x | x |
| 63 | x | x | x | x | o |
| 64 | x | x | x | o | x |
| 65 | x | x | o | x | x |
| V - 71 | o | x | x | x | x |
| 72 | x | x | x | x | o |
| 73 | x | x | x | o | x |
| 74 | x | x | o | x | x |
| 75 | x | o | x | x | x | o = open
x = closed

The hydrogen-rich product recovered in VSA unit 20 contains less than 3% of impurities, which may include a small amount of CO and $CO_2$. The hydrogen product gas is discharged from VSA unit 20 through line 55.

For certain purposes hydrogen gas free from carbon oxides is required. In such case the hydrogen-rich product in line 55 is heated by heat exchange with higher temperature streams, as shown for example at 56 and 57, and introduced into methanator 22 wherein the CO and $CO_2$ are reacted with the hydrogen in the presence of the usual methanation catalyst (nickel/$Al_2O_3$CaO) under conventional conditions (450°–500° F., 250–300 psia). The hydrogen product gas thus freed of oxides of carbon, is discharged from methanator 22 via line 59 and is cooled.

Table 3 below summarizes a typical operation in accordance with the invention showing stream compositions and operating conditions referring to the lines in FIG. 1.

TABLE 3

| | Stream No. | | | | | | | |
|---|---|---|---|---|---|---|---|---|
| | 27 | 35 | 46 | 39 | 50 | 53 | 55 | 59 |
| Mole % | | | | | | | | |
| $CH_4$ | 24.90 | 7.41 | 0.10 | 0.10 | 0.10 | 0.14 | 0.18 | 1.86 |
| $C_2H_6$ | 0.03 | — | — | — | — | — | — | — |
| $CO_2$ | 0.10 | 6.19 | 5.92 | 13.04 | 15.42 | 21.35 | 0.98 | — |
| $N_2$ | 0.20 | 0.15 | 0.21 | 0.21 | 0.21 | 0.29 | 0.37 | 0.39 |
| CO | — | 5.59 | 9.89 | 2.78 | 0.40 | 0.55 | 0.70 | — |
| $H_2$ | — | 41.20 | 46.15 | 53.27 | 55.65 | 77.31 | 97.77 | 94.98 |
| $H_2O$ | 74.77 | 39.46 | 37.72 | 30.61 | 28.22 | 0.36 | — | 2.77 |
| Moles/hr. | 1429.3 | 1865.9 | 2153.7 | 2153.8 | 2153.8 | 1550.2 | 1213.8 | 1172.8 |
| Pressure (psia) | 365 | 320 | 315 | 302 | 287 | 282 | 270 | 263 |
| Temperature (°F.) | 847 | 1430 | 1800 | 817 | 469 | 100 | 85 | 700 |

The production and recovery of high purity hydrogen from a methane-rich gas stream in accordance with the present invention is particularly advantageous for expanding the capacity of an existing plant employing steam-methane reforming. In such existing plants the formed carbon dioxide is generally separated from the hydrogen in the reformate by absorption in a solvent such as monoethanolamine. Expanding such existing plant by adding a secondary reforming operation results in a bottleneck of the plant because of the additional load of $CO_2$ to be removed. In systems employing only primary reforming the entire $CO_2$ removal unit reboiler (regeneration) duty can be supplied from process gas cooling. However, process gas cooling does not provide sufficient reboiler duty to handle the increased $CO_2$ load resulting from added secondary reforming. Moreover, the additional fuel costs associated with the requirement for supplemental steam to supply sufficient reboiler duty can reduce the cost advantage of an oxygen secondary reformer expansion. Resort to a typical PSA unit for effecting recovery of hydrogen from the reformed gas lowers the incremental production capacity due to the low $H_2$ recovery of existing commercial PSA systems. In addition, the low pressure purge gas must be recovered as fuel for this alternate scheme to be economical; this can require reformer burner modifications or a purge gas compressor. These drawbacks are avoided by employing for the expanded plant using oxygen secondary reforming the five step vacuum swing adsorption cycle herein described. In expanding an existing plant, if desired, the five step adsorption cycle may be used in conjunction with the existing solvent system hydrogen recovery unit, to take care of the additional $CO_2$ removal capacity required. Alternatively, the five step adsorption unit may be of sufficient capacity to handle the total reformate load, replacing the existing solvent absorption unit. The five step adsorption unit described operates at lower energy cost than that of a conventional $CO_2$ removal unit and affords full hydrogen production capacity with elimination of equipment for purging of the adsorbent bed with outside gas otherwise needed in the typical PSA units.

The advantages of the present invention are realized by the novel combination utilizing for economic production of high quality hydrogen: steam reforming of natural gas or other methane-rich gas stream followed by secondary reforming with oxygen; wherein hydrogen is recovered from the reformed gases by a five step selective adsorption unit operating in cycle sequence undergoing the steps hereinbefore described.

What is claimed:

1. The method for the production and recovery of high purity hydrogen in high yield from a methane-rich gas mixture which comprises the following operations:
   (A) subjecting said mixture to a primary steam methane reforming operation at a low steam to methane molar ratio of up to about 2.5;
   (B) subjecting the primary reformate from (A) to secondary reforming by reaction with molecular oxygen to form a secondary reformate, thereby converting residual methane in said primary reformate to hydrogen and oxides of carbon;
   (C) subjecting the secondary reformate from (B) to a high temperature water gas shift reaction carried out at a temperature ranging from 675° to 820° C. followed by a low temperature water gas shift reaction carried out at a temperature ranging from 400° to 470° C., whereby the carbon monoxide therein reacts with added steam to form $CO_2$ and additional hydrogen;
   (D) cooling the resulting hydrogen-rich gas product, after undergoing said shift reactions, to condense water vapor therein;
   (E) removing the condensate formed in (D) and collecting the uncondensed vapor portion comprising chiefly hydrogen and carbon dioxide and subjecting said vapor portion to adsorptive removal of carbon dioxide therefrom by a sequence of steps comprising:
   (i) passing said uncondensed vapor for a predetermined time period and at superatmospheric pressure through a bed of solid adsorbent preferentially selective for sorption of carbon dioxide, whereby hydrogen is discharged from said bed as essentially pure primary product while carbon dioxide is retained in said adsorbent; then regenerating said carbon dioxide-laden adsorbent by the steps of
   (ii) first rinsing the carbon dioxide-laden bed of adsorbent with a stream of carbon dioxide passed through said bed at superatmospheric pressure;
   (iii) then depressurizing the rinsed bed to an intermediate pressure level by gas withdrawal therefrom in a direction countercurrent to that employed in the adsorption step (i), thereby removing sorbed carbon dioxide from said bed;
   (iv) directly following the recited depressurizing (iii) evacuating the adsorbent bed in said countercurrent direction to subatmospheric pressure level thereby further removing residual carbon dioxide therefrom; and
   (v) restoring the evacuated bed to superatmospheric pressure level for repetition of the recited sequence beginning with the adsorption in step (i) by repressuring with part of the pure hydrogen primary product obtained.

2. The method of claim 1 wherein the defined adsorptive separation of $CO_2$ from $H_2$ in said vapor is effected in a pressure swing adsorption system comprised of five adsorbent beds operated in parallel.

3. The method as defined in claim 2 wherein the carbon dioxide employed in the recited rinsing step is obtained by desorption of a companion carbon dioxide-laden bed.

4. The method as defined in claim 1 wherein said secondary reforming is effected to provide an outlet temperature in the range of 1650° to 1800° F.

5. The method as defined in claim 1 wherein said high temperature water gas shift reaction is carried out in the presence of catalyst comprising chrome promoted iron oxide and said low temperature shift reaction is carried out in the presence of catalyst comprising CuZn supported on $Al_2O_3$.

6. The method as defined in claim 1 wherein the hydrogen stream discharged from the adsorbent bed as primary product is heated to reaction temperature to effect reaction of hydrogen with any residual carbon oxides present in said stream, thereby converting said carbon oxides to methane.

7. The method as defined in claim 1 wherein the secondary reformate has a residual methane content of less than approximately 0.5 mole percent.

8. The method as defined in claim 1 wherein the secondary reformate has a residual methane content in the range of approximately 0.1 to 0.4 mole percent.

9. The method as defined in claim 1 wherein the secondary reformate has a residual methane content of approximately 0.2 mole percent.

* * * * *